United States Patent
Aravamudan et al.

(10) Patent No.: US 6,567,398 B1
(45) Date of Patent: May 20, 2003

(54) DISTRIBUTED CALL SYSTEM

(75) Inventors: Murali Aravamudan, Freehold, NJ (US); Prakash Iyer, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/092,495

(22) Filed: Jun. 5, 1998

(51) Int. Cl.$^7$ .......................... H04L 12/66; H04M 1/64
(52) U.S. Cl. .................. 370/352; 379/88.17; 379/900; 709/203
(58) Field of Search ............................. 370/259–262, 370/351–356, 400–402, 389; 709/200–205, 217–218, 311, 107; 707/3, 4, 10, 102–104; 379/201–206, 210–215, 88.17, 93.1, 93.05, 269

(56) References Cited

U.S. PATENT DOCUMENTS

| | | | |
|---|---|---|---|
| 5,822,422 A | 10/1998 | Daase et al. | 379/269 |
| 5,850,433 A | * 12/1998 | Rondeau | 379/88.17 |
| 5,960,004 A | 9/1999 | Ramstrom et al. | 370/469 |
| 5,974,409 A | * 10/1999 | Sanu | 707/3 |
| 5,999,525 A | * 12/1999 | Krishnaswamy | 370/352 |

(List continued on next page.)

FOREIGN PATENT DOCUMENTS

| | | | |
|---|---|---|---|
| DE | 0 766 487 A2 | 4/1997 | H04Q/3/545 |
| EP | WO 93 00776 A | 1/1983 | H04Q/3/545 |

OTHER PUBLICATIONS

European Search Report dated Mar. 16, 2000 for Application No. 99304031.0-2209.

(List continued on next page.)

*Primary Examiner*—Steven Nguyen
(74) *Attorney, Agent, or Firm*—Eugene J. Rosenthal (57) ABSTRACT

Telephone service is supplied using a distributed architecture that employs a collection of resources each of which exposes a hierarchical namespace. The architecture includes two fundamental resource types, the device server and the call coordinator, which are interconnected by a network employing a common protocol, e.g., TCP/IP. The interaction between the various resources follows "client-server" principles to implement end-to-end communication. Device servers represent physical/logical telephone devices, which include a) end-point device servers and b) gateway device servers. End-point device servers 1) represent controls for communication, such as keypads, indicator lamps, and displays, and 2) perform media rendering, e.g., voice digitization, transport, and reconstruction. Gateway device servers have two "sides". One side is implemented to appear to a call coordinator as if it were a device server, and the other side has an interface adapted to interwork with a preexisting island of telephone service. In the term "device server", "server" is used in the conventional manner of the "client-server" architecture, where the server serves request from the clients and does not take action unless it is in response to a client request. A call coordinator functions in the role of the "client". The device servers are unaware of communication state, which is maintained by the call coordinator and exposed as a hierarchical namespace. The call coordinator treats the processing of a call as a sequence of steps each of which can be implemented by a small piece of computer executable code called a "feature applet".

10 Claims, 3 Drawing Sheets

U.S. PATENT DOCUMENTS

| | | | | | |
|---|---|---|---|---|---|
| 6,031,836 | A | * | 2/2000 | Haserolt | 370/401 |
| 6,073,163 | A | * | 6/2000 | Clark | 709/203 |
| 6,078,582 | A | * | 6/2000 | Curry et al. | 370/352 |
| 6,091,808 | A | * | 7/2000 | Wood et al. | 370/352 |
| 6,157,648 | A | * | 12/2000 | Voit | 370/401 |
| 6,163,531 | A | * | 12/2000 | Kumar | 370/260 |
| 6,198,738 | B1 | * | 3/2001 | Chang et al. | 370/352 |
| 6,201,805 | B1 | * | 3/2001 | Strathmeyer | 370/352 |
| 6,310,873 | B1 | * | 10/2001 | Rainis et al. | 370/352 |
| 6,335,927 | B1 | * | 1/2002 | Elliott et al. | 370/352 |

OTHER PUBLICATIONS

Katzchner, L. et al.: System 12 Konzeption und Realisierung der Software, pp. 173–183, 1989/ with English document.

"Architecture Framework revision 1.0", Enterprise Computer Telephony Forum, retrieved from the Internet: URL: www.ectf.org, May 12, 1997.

Rau, L: "Inferno: One Hot OS", vol. 22, No. 6, pp. 53–54, Jun. 1, 1997.

* cited by examiner

DISTRIBUTED CALL SYSTEM

TECHNICAL FIELD

This invention relates to the providing of communication services using a distributed call system.

BACKGROUND OF THE INVENTION

A well known problem in the art of telephony is that the systems which provide telephone service, e.g., central offices (CO), private branch exchange (PBX), and internet telephony servers, are discrete islands of functionality, and each such island has its own particular syntax and semantics. In addition, each of the larger islands has its own subislands which likewise employ their own respective syntaxes and semantics. For example, a CO employs a) signaling, system 7 (SS7), b) integrated services digital network primary or basic rate (ISDN-PRI/BRI), c) T1 wink/start, d) analog loop start, and e) analog ground start; while internet telephony has a) H.323 and b) session invitation protocol (SIP). The use of the different syntaxes and semantics makes it difficult to easily interconnect the various islands, and it is virtually impossible to provide features that work together seamlessly across the various islands. In addition, there is a need to integrate with the already existing islands of communication other forms of communication, such as quasi-synchronous communication, which include, for example, forms of instantaneous messaging such as a) paging or b) buddy lists for providing private chat rooms.

SUMMARY OF THE INVENTION

We have recognized that seamless telephony can be provided across the various islands of telephony functionality by supplying telephone service using a distributed architecture that employs a collection of resources each of which exposes a hierarchical namespace. The architecture of the invention includes two fundamental resource types, namely, i) the device server and ii) the call coordinator, which are interconnected by a network employing a common protocol, e.g., transmission control protocol/internet protocol (TCP/IP). Each resource can participate in more than one call, i.e., each resource acts as a distributed file system that can arbitrate various requests presented to it. The interaction between the various resources that are available, which are substantially independent, follows "client-server" architecture principles to implement end-to-end communication.

More specifically, typical device servers represent physical/logical telephone devices, which include a) end-point device servers and b) gateway device servers. End-point device servers 1) represent controls for communication, such as keypads, indicator lamps, and displays, and 2) perform media rendering, e.g., voice digitization, transport, and reconstruction. End-point device servers may include phone device servers. Gateway device servers have two "sides". One side is implemented to appear to a call coordinator as if it were a device server, and the other side has an interface adapted to interwork with a preexisting island of telephone service. Gateway device servers may include line device servers. In the term "device server", "server" is used in the conventional manner of the "client-server" architecture, where the server serves request from the clients and does not take action unless it is in response to a client request.

A call coordinator functions in the role of the "client" of the conventional "client-server" architecture, e.g., it initiates requests for services to the various device servers. Since the call coordinator is the client, it is able to request service from various ones of the servers, i.e., device servers or gateway servers, as is appropriate for the service being provided on a particular call and consistent with stored rules or registrations. The device servers are unaware of communication state, which is the interaction among multiple device servers. Instead, communication state is maintained by the call coordinator, which exposes the communication state as a hierarchical namespace. A hierarchical namespace is analagous to a computer disk-based hierachical file system except that what appears in the nodes and leaves of the hierarchy may not be actual directories and files but instead may be other data structures in memory which are presented in the form of a file system. The call coordinator treats the processing of a call as a sequence of steps each of which can be implemented by a small piece of computer executable code called a "feature applet".

Thus, by viewing the various devices as clients and the call coordinator as the server, the invention implements the opposite of conventional systems.

DETAILED DESCRIPTION

The following merely illustrates the principles of the inventions. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intend intended to encompass both structural and functional equivalents thereof. Additionally, it is intended that such equivalents include both currently known equivalents as well as equivalents developed in the future that performs the same function, regardless of structure.

As used herein, a hierarchical namespace is analagous to a computer disk-based hierachical file system, which may be represented as a tree structure, except that what appears in the nodes and leaves of the hierarchy may not be actual directories and files but instead may be other data structures in memory which are presented in the form of a file system. Thus, a hierarchical namespace is comparable to a so-called "RAM-disk", except that the namespace can be bound to a disk file system.

In accordance with the principles of the invention, seamless telephony can be provided across the various islands of telephony functionality by supplying telephone service using a distributed architecture that employs a collection of resources each of which exposes a hierarchical namespace to at least one other resource. The architecture of the invention includes two fundamental resource types, namely, i) the device server and ii) the call coordinator, which are interconnected by a network employing a common protocol, e.g., transmission control protocol/internet protocol (TCP/IP). Each resource can participate in more than one call, i.e., each resource acts as a distributed file system that can arbitrate various requests presented to it. The interaction between the various resources that are available, which are substantially independent, follows "client-server" architecture principles to implement end-to-end communication. In accordance with an aspect of the invention, by using the namespace all communications among the resources of the distributed architecture appear to be file system communications.

More specifically, in the term "device server", "server" is used in the conventional manner of the "client-server" architecture, where the server serves request from the clients and does not take action unless it is in response to a client request. The device server maintains protocol state information for the protocol that it uses to communicate with the call coordinator. Each device server exposes itself as a hierarchical namespace so that any client that wants to make use of the services provided by the device server, accesses the device server as if it is accessing a distributed file system. Typical device servers represent physical/logical telephone devices, which include a) end-point device servers and b) gateway device servers.

End-point device servers 1) represent controls for communication, such as keypads, indicator lamps, and displays, and 2) perform media rendering, e.g., voice digitization, transport, and reconstruction. End-point device servers may include phone device servers; an autoattendant (voice messaging) server; servers for intelligent personal communications, so-called intelligent agents; and the like. One example of an end-point device server is a phone device server. A phone device server typically models a telephone set which consists of a) a control surface which is employed by a user for call initiation, termination, and control operations, and b) a media rendering engine, e.g., a speaker and/or microphone for audio applications, a display screen for video applications, and the like.

The actual control surface and media rendering details may be different for various particular embodiments, i.e., for different telephone sets or communication devices. For example, a standard plain old telephone service (POTS) telephone set has no display and many aspects of its control surface are actually implemented using the media of the POTS telephone set itself for in-band signaling. By contrast, a so-called personal computer (PC) soft phone uses menus/windows as control surface, with audio rendering done through the PC's sound card. Another type of phone device is a PC running a standard H.323 (SIP) client, such as a Mircosoft's NetMeeting phone. For such a phone device a proxy for the SIP client runs, typically in the common protocol network and exposes a namespace interface, e.g., a file system interface. Additionally, a Proxy Device Server implementing the Instantaneous Messaging (IM) protocol RVP so that IM clients can make/receive/manipulate circuit/packet phone calls in a seamless fashion, may be employed as a phone device server. All of these, and other, phone devices may be connected to appropriate phone device servers.

Note that standard telephony concepts such as dial tone, ringing, and the like are details local the particular phone device. Thus, a phone device server that supports a POTS telephone would likely supply dial tone, whereas the PC user interface may have no direct analogue of a dial tone, and hence the phone device server supporting a PC phone would not provide it. The important idea is that any other client, such as the call coordinator, using a phone device server is oblivious of the individual/local details of the end-point device.

For a POTS telephone set a phone device server may be implemented in the form of a PC with a POTS interface card for connection to a POTS telephone set and a network card for TCP/IP connectivity. When used with TCP/IP, the network card may be any type of communications device that can be used to obtain TCP/IP connectivity, such as network interface cards (NIC), conventional analog modems, optical fiber interface cards, integrated services digital network (ISDN) modems, any form of digital subscriber loop (DSL), or the like. The phone device server may be implemented in the form of a subscriber loop carrier or private branch exchange (PBX) that have been outfitted with an interface, such as a TCP/IP interface card, for connecting to the network used by the call coordinator and other device servers.

Gateway device servers have two "sides". One side is implemented to appear to a call coordinator as if it were a device server, and is for connecting the gateway device server to the network used by the call coordinator and other device servers. The other side of the gateway device server has an interface adapted to interface with, as well as control and operate, elements of a preexisting island of telephone service. An exemplary gateway device server is a line device server.

A line device server typically models a legacy network interface which is capable of supporting one or more telephone calls through a preexisting island of telephone service, such as the public switched telephone network (PSTN). The legacy network interface may include both call control and media rendering aspects. Exemplary legacy network interfaces include: a) a telephony card supporting one or more analog loop start interfaces for a POTS network connection; b) a telephony card supporting one or more ISDN primary rate interfaces (PRI) interfaces for use with ISDN network connections; c) a standard private branch exchange (PBX) which can be controlled via an accessible interface; d) a proxy line device server which exchanges H.323 protocol with H.323 gateways, such as a proxy phone/line device server which acts as an H.323 multipoint control unit (MCU) to other H.323 clients, or a proxy line device server which implements the H.323 RAS protocol to act as a registration/admission server for H.323 clients in a specific domain (Note that the RAS/MCU device server typically is represented both as a phone device server and line device server proxy for multiple line and phone devices simultaneously); and e) a proxy phone/line device server which implements the SIP server protocol. Note that in addition to enabling interfacing with legacy networks, the principles of the invention can be used to permit interfacing with islands of telephony that have yet to be developed.

A primary function of a gateway device server is to act as a gateway between the network connecting the device servers and call coordinators and some other external network, e.g., a legacy network which is one of the islands of telephony. To this end, the gateway device server is a valid entity in the legacy network and employs the appropriate protocol of that legacy network. By exposing a namespace to its clients, namely, the call coordinator, individual gateway device servers shield the call coordinator from specific signaling protocols of the legacy network. This is achieved by maintaining protocol specific state in the gateway device server.

Device servers can handle multiple calls from a single call coordinator, as well as handle multiple such call coordinators. To handle such multiple interactions and multiplexing, device servers maintain local state.

A call coordinator accomplishes communications among various device servers. The call coordinator may be implemented as a software module that is executed by a computer connected to the network to which the device servers are attached. The computer executing the call coordinator may be separate from the computer, or computers, of the device servers, or it may share processing power with one or more of the device server computers, or other computers attached to the network. Alternatively, the functionality of the call coordinator may be distributed over several computers, which may be separate from, or shared with, the computers of the device servers, in any combination. A single network may have more than one call coordinator attached to it.

The notion of call/communication, and any associated management tasks, is entirely handled by the call coordinator. The call coordinator functions in the role of the "client" of the conventional "client-server" architecture, e.g., it initiates requests for services to the various device servers. Typically, such requests are in response to a so-called "event" that is detected by the call coordinator. Since the call coordinator is the client, it is able to request service from various ones of the servers, i.e., device servers or gateway servers, as is appropriate for the service being provided on a particular call and consistent with stored rules or registrations.

The device servers are unaware of communication state, which is the interaction among multiple device servers. Instead, communication state is maintained by the call coordinator, which exposes the communication state as a hierarchical namespace. As a client of the device servers, the call coordinator manipulates the device servers to accomplish communications. The call coordinator furthermore captures and exports such an interaction, known as a "call session", as a hierarchical namespace.

The call coordinator treats the processing of a call as a sequence of steps each of which can be implemented by a small piece of computer executable code called a "feature applet". Feature applets perform a specific step in call processing and as part of the step it typically manipulates the call tree of the namespace exposed by the call coordinator. That is, apart from loading the feature applets, the call coordinator and the feature applets communicate entirely through the call tree. Feature applets can be dynamically loaded and executed by the call coordinator. In accordance with an aspect of the invention, the feature applet code can be located somewhere else in the network and can be loaded on the fly from the network, or the feature applet itself can even be executed somewhere else in the network. Since the session state is manipulated using the call tree which is exposed by the call coordinator as a hierarchical namespace, the location where the feature applet executes, as part of processing the current call/session is irrelevant.

The call coordinator supports an explicit user model. That is, users of the system are authenticated by the call coordinator and are bound to specific devices. Users of the system may also dictate what feature applets are run by the call coordinator while processing a call on their behalf. To accomplish this, feature applets may be logically grouped for every user of the system. Advantageously, the call coordinator provides a facility for incrementally evolving the system for each user.

Figure 1:
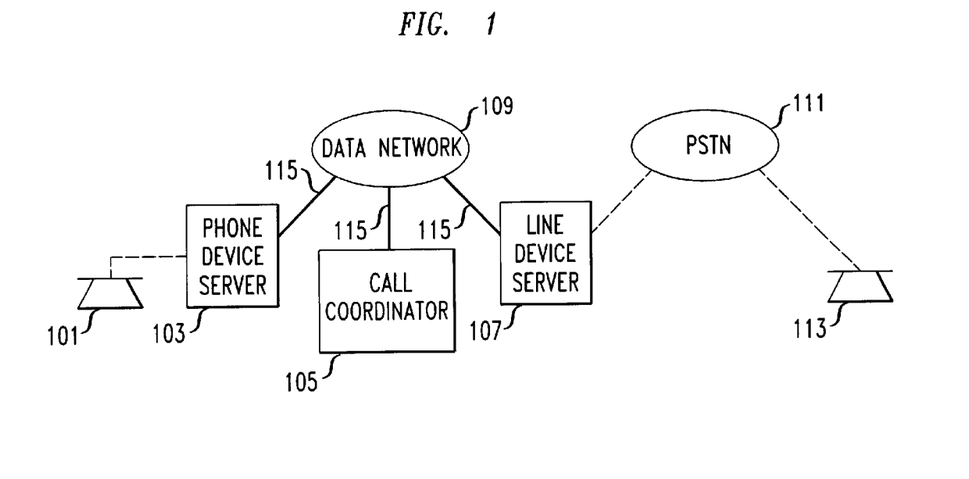
FIGS. 1, 3, 4, and 6 show exemplary architectures for implementing telephony service in accordance with the principles of the invention.

FIG. 1 shows an exemplary architecture for implementing telephony service in accordance with the principles of the invention. Shown in FIG. 1 are a) POTS telephones 101 and 113, b) phone device server 103, c) call coordinator 105, d) line device server 107, e) data network 109, f) public switched telephone network (PSTN) 111, and g) data links 115. POTS telephone 101 is connected via a POTS interface to phone device server 103. Phone device server 103, call coordinator 105 and line device server 107 are connected by data links, e.g., TCP/IP links 115, to data network 109, which is, for example, an Internet-like network or a so-called intranet. Line device server 107 is also connected to PSTN 111, e.g., by a tip-ring line, as is POTS telephone 113.

To achieve a telephone call between POTS telephone 101 and 113, the following exemplary functions occur.

When the telephone call is originated by POTS telephone 101, POTS telephone 101 is taken offhook, e.g., by a calling party, in the usual manner. This sends a signal to phone device server 103, which supplies, or causes the supplying of, dial tone, to POTS telephone 101. In response to dialing, taking place at POTS telephone 101, phone device server 103, removes, or causes the removal of, the dial tone and obtains the dialed digits. Thereafter, phone device server 103 raises an event, which may be achieved by writing to the event-control file of the tree representing the hierarchical namespace of phone device server 103. As noted the hierarchical namespace of phone device server 103 may be represented as a tree data structure.

Figure 2:
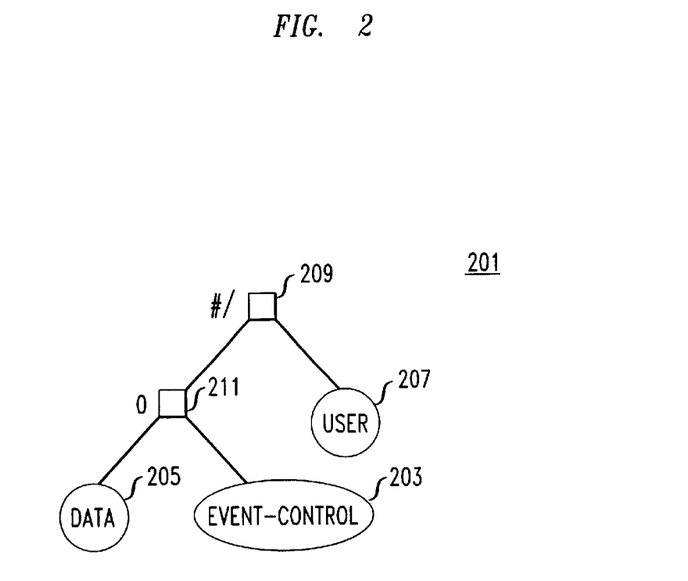
FIG. 2 shows simplified namespace tree for a device server.

FIG. 2 shows simplified namespace tree 201 for a device server, e.g., phone device server 103. As is conventional in file systems, root node 209 of namespace tree 201 is designated "#/". Event-control 203 is the file into which events that are to be indicated to call coordinator 105 are written, and into which service requests from call coordinator 105 are written. Thus, an indicator that a call is to be originated and the dialed digits are placed in event-control 203. Node data 205 is used for negotiation of media once a call is set up. Node user 207 contains indications as to which feature applets are to be run by call coordinator 105 in processing a call for the device server, as described in more detail hereinbelow.

Returning to FIG. 1 looks at the event-control files of the namespace trees of all the device servers that it supports. To this end, call coordinator 105 is aware of the configuration or topology of data network 109, including the location, e.g., the addresses of, the device servers as well as the particular devices behind those servers. Thus, for example, call coordinator 105 may have stored the identities—personal or electronic—of the owners of telephones served by phone device servers, the telephone numbers, if any, of such telephones, and the lines served directly, or the telephones reachable, by line device servers. The information necessary to provide call coordinator 105 with this awareness may be preprogrammed into call coordinator 105, may be dynamically discovered by call coordinator 105 using know processes, or may be achieved using a combination of the foregoing.

In response to reading the event-control file 203 call coordinator 105 undertakes to determine what event has taken place and what should be done about it. In the particular example being described, call coordinator 105 determines that a user at POTS telephone 101 desires to make a call to the telephone number indicated by the dialed digits. To achieve this in the manner desired by the caller, call coordinator 105 causes this necessary applets to execute.

In accordance with an aspect of the invention, the particular applets executed establishing or during a call may be:

a single applet custom for the calling party, as noted; a generic applet for the calling party; a sequence of applets that are custom to the calling party; a generic sequence of applets for the calling party; a single applet custom for the called party, as noted; a generic applet for the called party; a sequence of applets that are custom to the called party; a generic sequence of applets for the called party; any combination of the foregoing; and any other applet that one could imagine. The applets may all be located within call coordinator 105, they may be located external to call coordinator 105, or a combination of both. Also, the applets may all be executed by call coordinator 105 or they may be executed by other resources, e.g., servers or call coordinators, connected to data network 109.

For example, the caller may have a feature that permits the caller to specify multiple telephone number sequence at which to try specified called parties as a function of the telephone number dialed. If so, call coordinator 105 would run the applet for this feature, which would determine if the dialed number was associated with a multiple telephone number sequence. In the event that the dialed telephone number was not associated with a multiple telephone number sequence, call coordinator 105 would then run the default call placement applet. In the event that the dialed telephone number was associated with a multiple telephone number sequence, call coordinator 105 would obtain the first telephone number of the sequence and then execute the default call placement applet. If the call was not completed, control would be returned to the sequence applet, which would then obtain the next number, if any, and again execute the default call placement applet. If a call could not be completed to any of the telephone numbers in the sequence, the sequence applet would hand control back to call coordinator 105, which could then execute another applet, e.g., play a message to inform the calling party that the called party could not be reached.

Assuming that a simple voice connection is desired to be attempted for a single telephone number, call coordinator 105 determines, for data network 109, the network routable address of the called party that corresponds to the obtained digits. This is performed by a mapper within, or associated with, call coordinator 105. The mapper is, essentially, a routing engine. The function of the mapper is to supply to an applet, e.g., the currently executing applet, a restricted list of addresses for gateway device servers or phone device servers which are likely to be able to complete the call.

In this case of a simple voice connection, the mapper returns the address of line device server 107. Call coordinator 105 then requests, as a client, service from line device server 107. In particular, call coordinator 105 requests that line device server 107 establish a connection to the telephone number obtained from POTS telephone 101. This is achieved by writing an appropriate command, e.g., an establish connection command, into the event-control file of the namespace tree of line device server 107. In addition, the dialed digits are supplied in the the event-control file of the namespace tree of line device server 107, so that device server 107 will know which telephone reachable via line device server 107 is to be connected to.

In response to the request for service from call coordinator 105 via its TCP/IP interface, line device server 107 begins the process of establishing the requested connection from itself to POTS telephone 113. This is accomplished by using conventionally available protocols of PSTN 111, and is completely invisible to call coordinator 105. Upon achieving a connection to POTS telephone 113, or at least to a point in PSTN 111 for which it is worth establishing a media connection through to POTS telephone 101—e.g., when ringback or busy signals are being supplied by PSTN 111 to line device server 107—call coordinator 105 causes the establishment of a media path between phone device server 103 and line device server 107. This is achieved by call coordinator 105 writing service requests for media connectivity into the event-control file of the namespace tree of each of phone device server 103 and line device server 107.

Upon successful connection and establishment of the call, call coordinator 105 monitors the call in the event further service is required on the call. For example, call takedown may be requested in response to one of telephones 101 or 113 going on-hook. Alternatively, additional feature processing, such as call waiting, call transfer, or bill sharing, may be requested. As with call setup, the need to provide such service is indicated by requests placed into the event-control file of the namespace tree of the relevant one of phone device server 103 and line device server 107. Call coordinator 105 reads the event-control file, runs the appropriate applets, and, as client, issues service requests to the appropriate servers.

To terminate the call, for example, POTS telephone 101 goes on-hook. This event is written into the event-control file of the namespace tree of phone device server 103, and call coordinator 105 becomes aware of the event. In response to the event, an applet is run by call coordinator 105. In one embodiment of the invention, the applet may request disconnect service from phone device server 103 and line device server 107, by writing a disconnect command into each of their event-control files, along with specifying the respective telephone number to be disconnected.

Similarly, if it was POTS telephone 113 that went on-hook, an indication of this event is written into the event-control file of the namespace tree of line device server 107, which actually would likely be in the form of an indication that the particular line used by line device server 107 for the call disconnected. Upon detection of this event in the event-control file of line device server 107 call coordinator 105 runs the associated applet. In one embodiment of the invention, the applet may request disconnect service from phone device server 103 and line device server 107, by writing a disconnect command into each of their event-control files, along with specifying the telephone number to be disconnected.

Note that the particular applet executed call coordinator 105 in response to any event it is made aware of is entirely at the discretion of the implementor, and the nature of the applet is, advantageously, essentially unlimited. In fact, the applet executed may be specified by the implementor, specified by the ultimate user, or may be any combination thereof. Moreover, the code may even be written by the ultimate user. Furthermore, the code need not be located within, or executed by, call coordinator 105.

Figure 5:
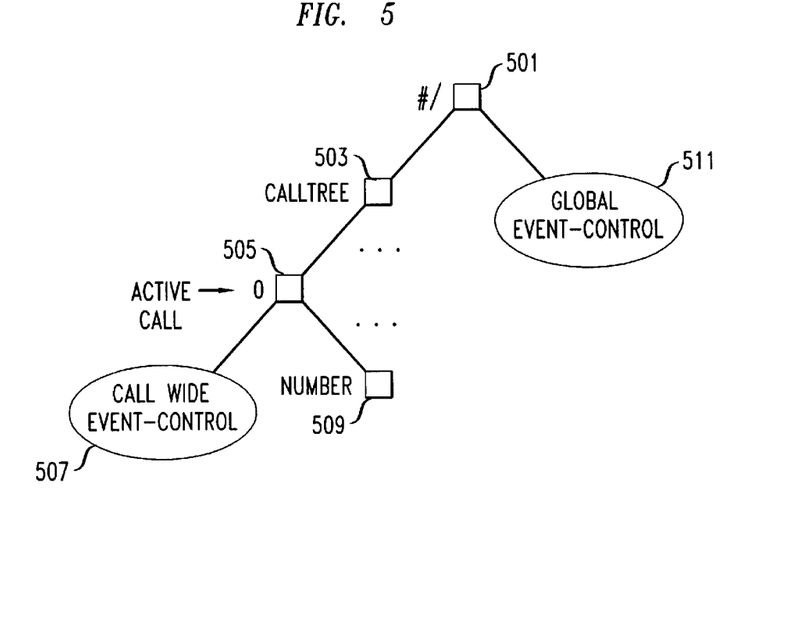
FIG. 5 shows an exemplary namespace of a call coordinator.

FIG. 5 shows an exemplary namespace of call coordinator 105. As for the namespace of a device server, root node 501 of the namespace is "#/".

Under root node 501 is global event-control file 511. Into global event-control file 511 are all events that pertain to all of the calls, e.g., globally related billing information, such as a change of billing rate schedule because of a change of time. Additionally, global event-control file 511 can be opened and read by programs, such as event detail recording, that desire to learn about all the call processing events that are taking place in this call coordinator.

Also under root node 501 is calltree node 503, under which all the calls currently active under the jurisdiction of call coordinator 105 can be found global event-control file 511. For each active call there is an active call node 505. In FIG. 5, only one active call is shown. Under each active call node 505 there is a call-wide event control file 507 and a number node 509 for each device on the call. Call-wide event control file 507 is used for events that pertain to the call as whole. Call-wide event control file 507 provides all the call processing events relevant to this particular call. The call coordinator and the feature applets may communicate through call-wide event control file 507.

Each number node 509 is identified by the network routable address of the device that it represents. The number node actually represents the entire namespace exposed by the identified device. Thus, the number node is not really a single node but instead is itself a tree of the namespace of a device server, with the root node of the tree being located in the location of number node 509.

Figure 4:
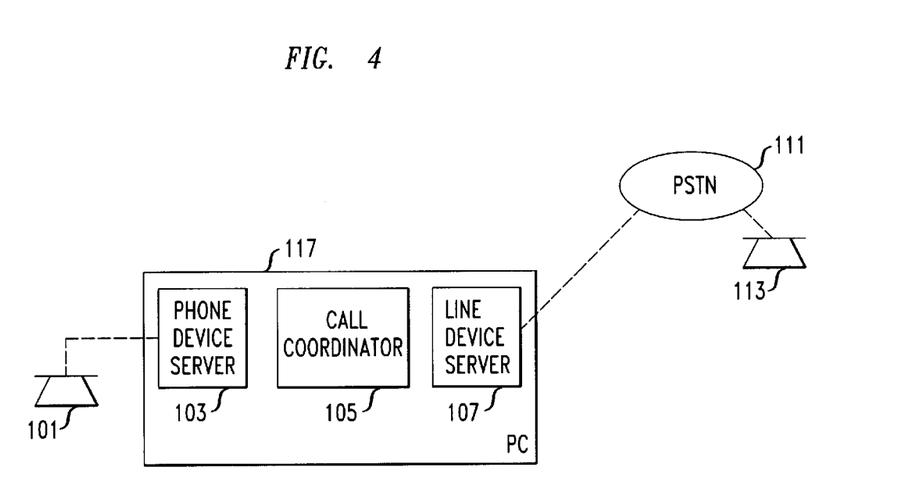

FIG. 4 shows another exemplary architecture for implementing telephony service in accordance with the principles of the invention. The embodiment of FIG. 4 is essentially the same as that of FIG. 1, except that the functionality of data network 109 has been subsumed into PC 117, thus also eliminating the need for data links 115. Functionally, however, a)POTS telephones 101 and 113, b)phone device server 103, c)call coordinator 105, d)line device server 107, and e)public switched telephone network 111 operate the same as was described in connection with FIG. 1.

Figure 3:
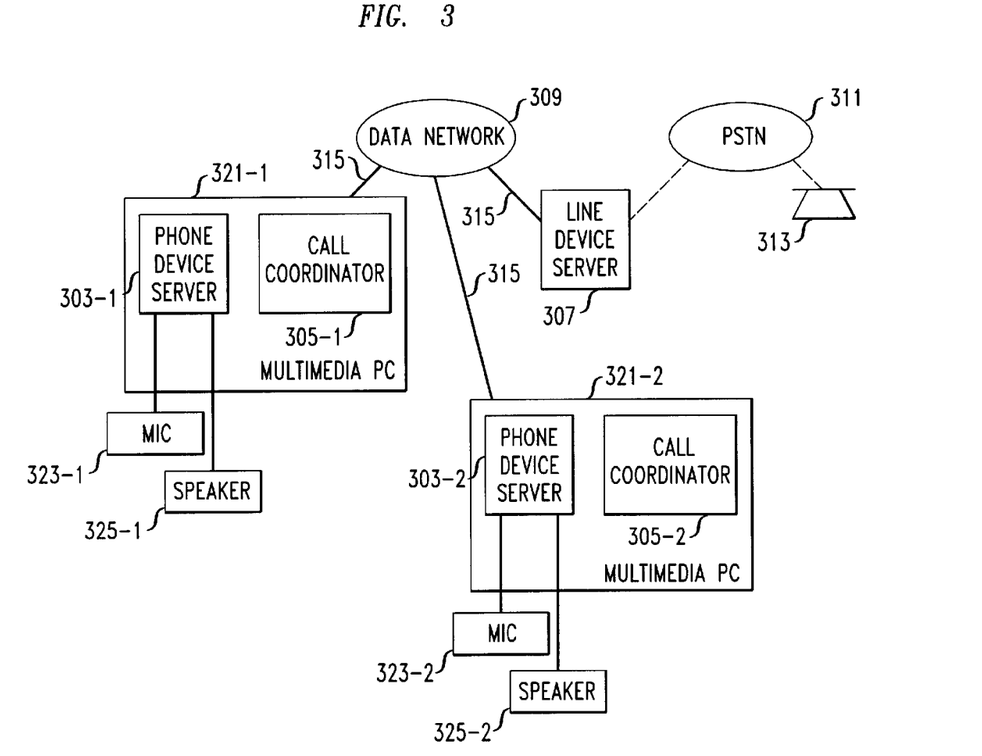

FIG. 3 shows yet another exemplary architecture for implementing telephony service in accordance with the principles of the invention. Shown in FIG. 3 are a) POTS telephone 313, b) phone device servers 303, including phone device servers 303-1 and 303-2; c) call coordinators 305; including call coordinators 305-1 and 305-2; d) line device server 307; e) data network 309; f) public switched telephone network (PSTN) 311; g) data links 315; h) multimedia PCs 321, including multimedia PCs 321-1 and 321-2; i) microphones (MIC) 323, including microphones 323-1 and 323-2; and j) speakers 325, including speakers 325-1 and 325-2. Phone device servers 303 performs the same functionality as phone device server 103 of FIG. 4, except that phone device servers 303 interface with the phone: device made up of their connected ones of microphones 323 and speakers 325 as processed through the one of multimedia PC 321 in which they reside, as well as the keyboard and monitor if any of that multimedia PC. Call coordinators 305 performs the same functionality as call coordinator 105 of FIG. 4.

Multimedia PCs 321-1 and 321-2 and line device server 307 are each connected by a data link, e.g., one of TCP/IP links 315, to data network 309, which is, for example, an Internet-like network or a so-called intranet. Phone device server 303-1 and call coordinator 305-1 can communicate with each other directly within multimedia PC 321-1, and can communicate with resources outside of multimedia PC 321-1 by using the TCP/IP link 315 that connects multimedia PC 321-1 to data network 309. Similarly, phone device server 303-2 and call coordinator 305-2 can communicate with each other directly within multimedia PC 321-2, and can communicate with resources outside of multimedia PC 321-2 by using the TCP/IP link 315 that connects multimedia PC 321-2 to data network 309. Line device server 307 is also connected to PSTN 311, e.g., by a tip-ring line, as is POTS telephone 313. Line device server 307, PSTN 311, and POTS telephone 313 each functions the same as its namesake counterpart in FIG. 4.

In the embodiment of FIG. 3, calls may be placed between and among the phone devices associated with multimedia PCs 321, as well as POTS telephone 313. Conference calling may be achieved, as well as many advanced features. Moreover, features that are appropriate to the phone devices of multimedia PCs 321, e.g., caller information displayed on the display screen, may be provided to one or more of such phone devices without providing them POTS telephone 313. This is achieved, in accordance with an aspect of the invention, as described above, by having the call coordinator execute the proper feature applets, e.g., in accordance with prior subscription to the features.

Figure 6:
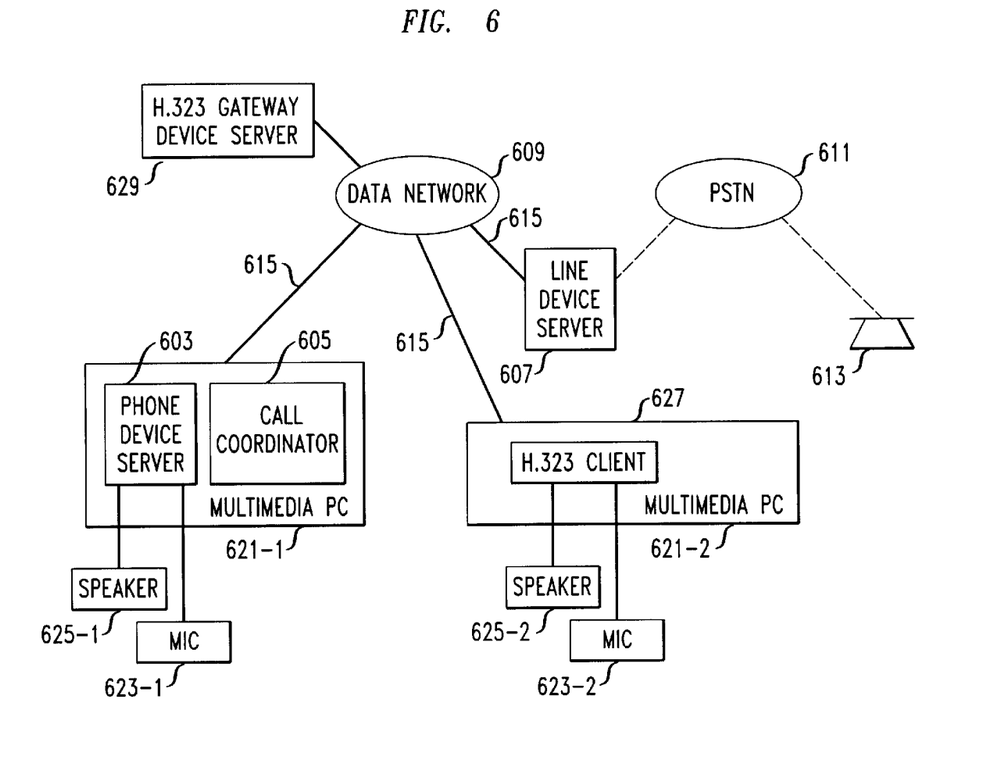

FIG. 6 shows yet another exemplary embodiment of the invention. In particular, the embodiment of the invention shown in FIG. 6 supports as a phone device an H.323 client. Shown in FIG. 6 are a) POTS telephone 613, b) phone device server 603; c) call coordinator 605; d) line device server 607; e) data network 609; f) public switched telephone network (PSTN) 611; g) data links 615; h) multimedia PCs 621, including multimedia PCs 621-1 and 621-2; i) microphones (MIC) 623, including microphones 623-1 and 623-2; j) speakers 625, including speakers 625-1 and 625-2; k) H.323 client 627; and l) H.323 gateway device server 629. Phone device server 603 performs the same functionality as each of phone device servers 303 of FIG. 3. Call coordinators 605 performs the same functionality as call coordinator 105 of FIG. 4. H.323 client 627, together with microphone 623-2 and speaker 625-2, as well as the keyboard and display of multimedia PC 621-2, if any, form a phone device that uses H.323 protocol for communicating.

Multimedia PCs 621-1 and 621-2, line device server 607, and H.323 gateway device server 629 are each connected by a data link, e.g., one of TCP/IP links 615, to data network 609, which is, for example, an Internet-like network or a so-called "intranet". Phone device server 603 and call coordinator 605 can communicate with each other directly within multimedia PC 621-1, and each can communicate with resources outside of multimedia PC 621-1 by using the TCP/IP link 615 that connects multimedia PC 621-1 to data network 609.

Similarly, H.323 client 627 can communicate with resources outside of multimedia PC 621-2 by using the TCP/IP link 615 that connects multimedia PC 621-2 to data network 609. More specifically, H.323 protocol of H.323 client may ride on top of the TCP/IP link 615 connecting multimedia PC 621-2 to network 609. Additionally, H.323 gateway device server 629 transmits and receives IP on its one of TCP/IP links 615 both TCP/IP using the protocol of call coordinator 605 and H.323 protocol over TCP/IP. The TCP/IP using the protocol of call coordinator 605 is for implementing the above-described first "side" of a gateway server which appears to call coordinator 605 as a device server. The H.323 protocol over TCP/IP is used by the legacy network interface of H.323 gateway device server—the second "side" of a gateway server—for communicating with phone device H.323 client on a virtual legacy network which is actually run over data network 609.

Line device server 607 is also connected to PSTN 611, e.g., by a tip-ring line, as is POTS telephone 613. Line device server 607, PSTN 611, and POTS telephone 613 functions the same as their namesake counterparts in FIG. 1.

In the embodiment of FIG. 6, calls may be placed between and among the phone devices associated with multimedia PCs 621, as well as POTS telephone 613. Conference calling may be achieved, as well as many advanced features. Moreover, features that are appropriate to the phone devices of multimedia PCs 621, e.g., caller information displayed on the display screen, may be provided to one or more of such phone devices without providing them POTS telephone 613. This is achieved, in accordance with an aspect of the invention, as described above, by having the call coordinator execute the proper feature applets, e.g., in accordance with prior subscription to the features.

In an exemplary embodiment of the invention, the base namespace protocol employed is Styx. Styx is a distributed file system protocol that does not semantically interpret what is read/written in individual nodes of the hierarchical namespace. Advantageously, Styx can be used as a control protocol where the entities that look like files need not actually be files. The system exploits this fact to carry a canonical call control protocol on top of Styx. Such a call structure may be similar to the well known Q.931. The protocol of the system includes the file system structure exposed by the device servers and the vocabulary that is used on top of the control files. The base signaling system is independent of the actual data transfer details. Data transfer negotiation is expressed separately, since call processing latencies may force bundling the data transfer negotiation in the call control phase itself. The separation of call control from data transfer negotiation is akin to H.323 protocol negotiation. Unlike Q.931, the base protocol uses a very simple ASCII encoding scheme similar to HTTP—a set of name/value pairs separated by a delimiter where certain name/value pairs are deemed mandatory based on the call control protocol primitive. Adding new name/value pairs can extend the base call control protocol. New features are added to the protocol through addition of new messages that do not alter the base semantics of the call control protocol. Entities in the system that do not understand a specific name/value pair, e.g., corresponding to a new feature invocation or new attribute to an existing feature, just ignore the pair and only honor the base call control semantics.

Advantageously, the above system makes it possible for an user to subscribe to multiple telephony service providers simultaneously and choose the set of features the user desires from each service provider. Further advantageously, the service provider has the ability to provide user specific features incrementally, and can evolve the overall system by adding new feature applets and device servers. Additionally, by adding new gateway device servers a service provider can incrementally add to the system new protocol capabilities. Moreover, addition of new gateway device servers does not in anyway impact existing feature applets or other device servers since the base system is tied together using the canonical call model based on the hierarchical namespace. Similarly new end-point device servers can be added to the system without disrupting the existing system. Since a) addition of new device servers happens in an entirely distributed fashion and b) basic call processing system does not have to maintain state across calls, the system is inherently scaleable.

What is claimed is:

1. A system for providing telecommunications services, comprising:
   a device server; and
   a call coordinator
   being coupled together via a data network in a client-server arrangement;
   wherein said call coordinator is adapted to request at least one service from said device server and is adapted to maintain communication state;
   wherein said device server is adapted to represent telephone devices and is one of the group consisting of end-point device servers and gateway device servers, wherein said end-point device servers are adapted to perform a function from the group consisting of representing controls for communication and performing media rendering, and wherein each of said gateway device servers has two sides, a first of said sides is adapted to appear to said call coordinator as if said first side were a device server and a second of said sides has an interface adapted to interwork with at least one type of preexisting telephone service;

CHARCTERIZED in that
   said device server is the server in said client-server arrangement and said call coordinator is the client in said client-server arrangement; and in that
   said call coordinator is adapted to expose said communication state as a hierarchical namespace for use in processing calls through said system for providing telecommunications services.

2. The invention as defined in claim 1 wherein said device server is an end-point device server.

3. The invention as defined in claim 2 wherein said end-point device server is a phone device server.

4. The invention as defined in claim 1 wherein said device server is a gateway device server.

5. The invention as defined in claim 4 wherein said gateway device serveris a line device server.

6. The invention as defined in claim 5 wherein said gateway device server has a first interface for controlling an aspect of legacy telephony service and a second interface which appears to said call coordinator as a device server.

7. The invention as defined in claim 1 wherein said call coordinator is adapted to execute feature applets.

8. The invention as defined in claim 1 wherein said call coordinator is adapted to coordinate call processing through execution of feature applets.

9. The invention as defined in claim 1 wherein said call coordinator coordinates call processing through feature applets, at least one of said feature applets not be executed by said call coordinator.

10. A method for providing telecommunications services, in a network comprising
    a device server; and
    a call coordinator;
    the method comprising
    coupling together said device server and call coordinator by a data network in a client-server arrangement;
    wherein said call coordinator which is adapted to request at least one service from said device server and is adapted to maintain communication state;
    wherein said device server is adapted to represent telephone devices and is one of the group consisting of end-point device servers and gateway device servers, wherein said end-point device servers are adapted to perform a function from the group consisting of representing controls for communication and performing media rendering, and wherein said gateway device servers have two sides, a first of said sides is adapted to appear to said call coordinator as if said first side were a device server and a second of said sides has an interface which is adapted to interwork with at least one type of preexisting telephone service;

CHARACTERIZED BY:
    said coupling being performed so that said device server is the server in said client-server arrangement and said call coordinator is the client in said client-server arrangement; and
    by exposing said communication state as a hierarchical namespace by said call coordinator for use in providing said telecommunications services.

* * * * *